(12) United States Patent
Yokomakura et al.

(10) Patent No.: US 11,165,608 B2
(45) Date of Patent: Nov. 2, 2021

(54) BASE STATION APPARATUS, TERMINAL APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Kazunari Yokomakura, Sakai (JP); Shohei Yamada, Sakai (JP); Hidekazu Tsuboi, Sakai (JP); Hiroki Takahashi, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 33 days.

(21) Appl. No.: 16/643,603

(22) PCT Filed: Sep. 7, 2018

(86) PCT No.: PCT/JP2018/033249
§ 371 (c)(1),
(2) Date: Mar. 2, 2020

(87) PCT Pub. No.: WO2019/050000
PCT Pub. Date: Mar. 14, 2019

(65) Prior Publication Data
US 2020/0351127 A1    Nov. 5, 2020

(30) Foreign Application Priority Data

Sep. 8, 2017   (JP) .............................. JP2017-172867

(51) Int. Cl.
*H04L 25/02*   (2006.01)
*H04L 1/18*    (2006.01)
(Continued)

(52) U.S. Cl.
CPC ........ *H04L 25/0226* (2013.01); *H04L 1/1819* (2013.01); *H04L 5/0051* (2013.01);
(Continued)

(58) Field of Classification Search
CPC . H04L 25/0226; H04L 1/1819; H04L 5/0051; H04L 5/0055; H04W 72/042; H04W 80/08
See application file for complete search history.

(56) References Cited

U.S. PATENT DOCUMENTS

2015/0181568 A1   6/2015  Seo et al.
2017/0208590 A1   7/2017  Kim et al.
2019/0075014 A1*  3/2019  Zhou ................... H04W 72/042

FOREIGN PATENT DOCUMENTS

EP       3 624 535 A1      3/2020
JP       2017-028708 A     2/2017
JP       2017-519401 A     7/2017

OTHER PUBLICATIONS

Official Communication issued in International Patent Application No. PCT/JP20181033249, dated Nov. 20, 2018.
(Continued)

*Primary Examiner* — Ronald B Abelson
(74) *Attorney, Agent, or Firm* — Keating & Bennett, LLP

(57) ABSTRACT

The present invention includes a receiver configured to receive a physical downlink control channel, and a transmitter configured to transmit a physical uplink control channel, wherein the receiver receives downlink control information carried on the physical downlink control channel, a downlink control information format of the downlink control information is used for scheduling of a physical downlink shared channel, the downlink control information format includes information indicating a resource of a sounding reference signal, and the physical uplink control
(Continued)

channel is transmitted, based on the information indicating the resource of the sounding reference signal.

6 Claims, 8 Drawing Sheets

(51) Int. Cl.
*H04L 5/00* (2006.01)
*H04W 72/04* (2009.01)
*H04W 80/08* (2009.01)

(52) U.S. Cl.
CPC ......... *H04L 5/0055* (2013.01); *H04W 72/042* (2013.01); *H04W 80/08* (2013.01)

(56) References Cited

OTHER PUBLICATIONS

NTT Docomo, "Revision of SI: Study on New Radio Access Technology", 3GPP TSG RAN Meeting #72, RP-161214, Jun. 13-16, 2016, 8 pages.

\* cited by examiner

BASE STATION APPARATUS, TERMINAL APPARATUS, COMMUNICATION METHOD, AND INTEGRATED CIRCUIT

TECHNICAL FIELD

The present invention relates to a base station apparatus, a terminal apparatus, a communication method, and an integrated circuit.

BACKGROUND ART

Technical studies and standardization of Long Term Evolution (LTE)-Advanced Pro and New Radio (NR) technology, as a radio access scheme and a radio network technology for fifth generation cellular systems, are currently conducted by the Third Generation Partnership Project (3GPP) (NPL 1).

The fifth generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

CITATION LIST

Non Patent Literature

NPL 1: RP-161214, NTT DOCOMO, "Revision of SI: Study on New Radio Access Technology", June 2016

SUMMARY OF INVENTION

Technical Problem

An object of the present invention is to provide a terminal apparatus, a base station apparatus, a communication method, and an integrated circuit that allow the base station apparatus and the terminal apparatus to efficiently communicate in the above-mentioned radio communication systems.

Solution to Problem (1) To accomplish the object described above, aspects of the present invention are contrived to provide the following measures. Specifically, a terminal apparatus according to an aspect of the present invention is a terminal apparatus for communicating with a base station apparatus, the terminal apparatus including a receiver configured to receive a physical downlink control channel, and a transmitter configured to transmit a physical uplink control channel, wherein the receiver receives downlink control information carried on the physical downlink control channel, a downlink control information format of the downlink control information is used for scheduling of a physical downlink shared channel, the downlink control information format includes information indicating a resource of a sounding reference signal, and the physical uplink control channel is transmitted, based on the information indicating the resource of the sounding reference signal.

(2) A base station apparatus according to an aspect of the present invention is a base station apparatus for communicating with a terminal apparatus, the base station apparatus including a transmitter configured to transmit a physical downlink control channel and a receiver configured to receive a physical uplink control channel, wherein the transmitter transmits downlink control information carried on the physical downlink control channel, a downlink control information format of the downlink control information is used for scheduling of a physical downlink shared channel, and the downlink control information format includes information indicating a resource of a sounding reference signal.

(3) A communication method according to an aspect of the present invention is a communication method for a terminal apparatus for communicating with a base station apparatus, the communication method including receiving a physical downlink control channel, transmitting a physical uplink control channel, and receiving downlink control information carried on the physical downlink control channel, wherein a downlink control information format of the downlink control information is used for scheduling of a physical downlink shared channel, the downlink control information format includes information indicating a resource of a sounding reference signal, and the uplink control channel is transmitted based on the information indicating the resource of the sounding reference signal.

(4) A communication method according to an aspect of the present invention is a communication method for a base station apparatus for communicating with a terminal apparatus, the communication method including transmitting a physical downlink control channel, receiving a physical uplink control channel, and transmitting downlink control information carried on the physical downlink control channel, wherein a downlink control information format of the downlink control information is used for scheduling of a physical downlink shared channel, and the downlink control information format includes information indicating a resource of a sounding reference signal.

(5) An integrated circuit according to an aspect of the present invention is an integrated circuit mounted on a terminal apparatus for communicating with a base station apparatus, the integrated circuit including a receiving unit configured to receive a physical downlink control channel and a transmitting unit configured to transmit a physical uplink control channel, wherein the receiving unit receives downlink control information carried on the physical downlink control channel, a downlink control information format of the downlink control information is used for scheduling of a physical downlink shared channel, the downlink control information format includes information indicating a resource of a sounding reference signal, and the uplink control channel is transmitted based on the information indicating the resource of the sounding reference signal.

(6) A communication method according to an aspect of the present invention is an integrated circuit mounted on a base station apparatus for communicating with a terminal apparatus, the integrated circuit including a transmitting unit configured to transmit a physical downlink control channel and a receiving unit configured to receive a physical uplink control channel, wherein the transmitting unit transmits downlink control information carried on the physical downlink control channel, a downlink control information format of the downlink control information is used for scheduling of a physical downlink shared channel, and the downlink control information format includes information indicating a resource of a sounding reference signal.

Advantageous Effects of Invention

According to the present invention, a base station apparatus and a terminal apparatus can efficiently communicate with each other.

DESCRIPTION OF EMBODIMENTS

Embodiments of the present invention will be described below.

Figure 1:
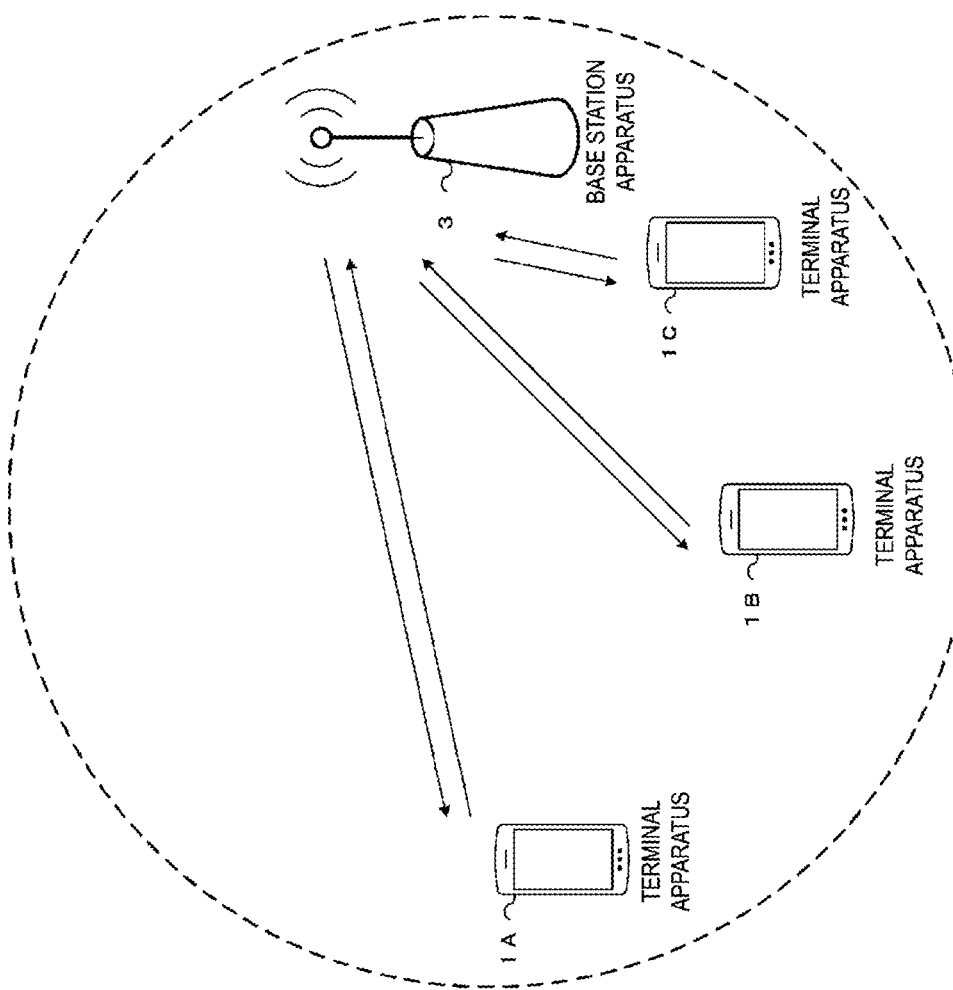
FIG. 1 is a diagram illustrating a concept of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Each of the terminal apparatuses 1A to 1C is hereinafter also referred to as a terminal apparatus 1.

The terminal apparatus 1 is also called a user terminal, a mobile station device, a communication terminal, a mobile device, a terminal, User Equipment (UE), and a Mobile Station (MS). The base station apparatus 3 is also referred to as a radio base station apparatus, a base station, a radio station, a fixed station, a NodeB (NB), an evolved NodeB (eNB), a Base Transceiver Station (BTS), a Base Station (BS), an NR NodeB (NR NB), NNB, a Transmission and Reception Point (TRP), or gNB.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, Universal-Filtered Multi-Carrier (UFMC), Filtered OFDM (F-OFDM), Windowed OFDM, or Filter-Bank Multi-Carrier (FBMC) may be used.

Note that the present embodiment will be described by using an OFDM symbol with the assumption that a transmission scheme is OFDM, and a case of using any other transmission scheme described above is also included in the present invention.

Furthermore, in FIG. 1, in the radio communication between the terminal apparatus 1 and the base station apparatus 3, the CP may not be used, or the above-described transmission scheme with zero padding may be used instead of the CP. Moreover, the CP or zero padding may be added both forward and backward.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

In FIG. 1, the following physical channels are used for the radio communication between the terminal apparatus 1 and the base station apparatus 3.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH is used to broadcast essential information block ((Master Information Block (MIB), Essential Information Block (EIB), and Broadcast Channel (BCH)) which includes essential system information needed by the terminal apparatus 1.

The PBCH may be used to broadcast a time index within a period of a block of synchronization signals (also referred to as SS/PBCH block). Here, the time index is information indicating indexes of the synchronization signal and PBCH in the cell. For example, in a case that three transmission beams are used to transmit the SS/PBCH block, an order of time within a predetermined period or a configured period may be indicated. The terminal apparatus may recognize a difference in time index as a difference in the transmission beam.

The PDCCH is used to transmit (or carry) Downlink Control Information (DCI) in a downlink radio communication (radio communication from the base station apparatus 3 to the terminal apparatus 1). Here, one or more pieces of DCI (which may be referred to as DCI formats) are defined for transmission of the downlink control information. In other words, a field for the downlink control information is defined as DCI and is mapped to information bits.

For example, information indicating a slot format may be indicated as the DCI. For example, the DCI may be defined to include information for indicating a downlink transmission period including a PDCCH and/or PDSCH, a gap, and an uplink transmission period including in a PUCCH and/or PUSCH and SRS.

For example, the DCI may be defined to include information for indicating a transmission period of a scheduled PDSCH.

For example, the DCI may be defined to include information for indicating a transmission period of a scheduled PUSCH.

For example, the DCI may be defined to include information for indicating a timing for transmitting a HARQ-ACK with respect to a scheduled PDSCH.

For example, the DCI may be defined to include information for indicating a timing for transmitting a HARQ-ACK with respect to a scheduled PUSCH.

For example, the DCI may be defined to be used for the scheduling of one downlink radio communication PDSCH in one cell (transmission of one downlink transport block).

For example, the DCI may be defined to be used for the scheduling of one uplink radio communication PUSCH in one cell (transmission of one uplink transport block).

Here, the DCI includes information of the scheduling of the PDSCH or the PUSCH. Here, the DCI for the downlink is also referred to as downlink grant or downlink assignment. Here, the DCI for the uplink is also referred to as uplink grant or Uplink assignment.

The PUSCH is used to transmit Uplink Control Information (UCI) in uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK). The HARQ-ACK may indicate a HARQ-ACK for downlink data (Transport block, Medium Access Control Protocol Data Unit (MAC PDU), or Downlink-Shared CHannel (DL-SCH)).

The PDSCH is used to transmit downlink data (Downlink Shared CHannel (DL-SCH)) from a Medium Access Control (MAC) layer. Furthermore, in a case of the downlink, the PSCH is used to transmit System Information (SI), a Random Access Response (RAR), and the like.

The PUSCH may be used to transmit uplink data (Uplink-Shared CHannel (UL-SCH)) from the MAC layer or a HARQ-ACK and/or CSI along with the uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 1 exchange (transmit and/or receive) signals with each other in higher layers. For example, the base station apparatus 3 and the terminal apparatus 1 may transmit and/or receive radio resource control (RRC) signaling (also referred to as RRC message or RRC information) in the RRC layer, respectively. The base station apparatus 3 and the terminal apparatus 1 may transmit and/or receive a Medium Access Control (MAC) control element in a Medium Access Control (MAC) layer. Here, the RRC signaling and/or the MAC control element is also referred to as higher layer signaling. The higher layer herein means a higher layer viewed from the physical layer, and thus, may include one or more layers such as a MAC layer, an RRC layer, an RLC layer, a PDCP layer, and a Non Access Stratum (NAS) layer. For example, the higher layer in a process of the MAC layer may include one or more layers such as an RRC layer, an RLC layer, a PDCP layer, and a NAS layer.

The PDSCH or PUSCH may be used to transmit the RRC signaling and the MAC control element. Here, in the PDSCH, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, information specific to the terminal apparatus (user-equipment-specific (UE-specific) information) may be transmitted through signaling dedicated to the certain terminal apparatus 1. The PUSCH may be used to transmit UE Capabilities in the uplink.

In FIG. 1, the following downlink physical signals are used for downlink radio communication. Here, the downlink physical signals are not used to transmit information output from the higher layers but are used by the physical layer.

Synchronization signal (SS)
Reference Signal (RS)

The synchronization signal may include a Primary Synchronization Signal (PSS) and a Secondary Synchronization Signal (SSS). A cell ID may be detected by using the PSS and SSS.

The synchronization signal is used for the terminal apparatus 1 to establish synchronization in a frequency domain and a time domain in the downlink. Here, the synchronization signal may be used for the terminal apparatus 1 to select precoding or a beam in precoding or beamforming performed by the base station apparatus 3. Note that the beam may be referred to as a transmission or reception filter configuration.

A reference signal is used for the terminal apparatus 1 to perform channel compensation on a physical channel. Here, the reference signal is used for the terminal apparatus 1 to calculate the downlink CSI. Furthermore, the reference signal may be used for a numerology such as a radio parameter or subcarrier spacing, or used for Fine synchronization that allows FFT window synchronization to be achieved.

According to the present embodiment, any one or more of the following downlink reference signals are used.

Demodulation Reference Signal (DMRS)
Channel State Information Reference Signal (CSI-RS)
Phrase Tracking Reference Signal (PTRS)
Tracking Reference Signal (TRS)

The DMRS is used to demodulate a modulated signal. Note that two types of reference signals may be defined as the DMRS: a reference signal for demodulating the PBCH and a reference signal for demodulating the PDSCH or that both reference signals may be referred to as the DMRS. The CSI-RS is used for measurement of Channel State Information (CSI) and beam management. The PTRS is used to track the phase in the time axis to ensure frequency offset due to phase noise. The TRS is used to ensure Doppler shift during fast travel. Note that the TRS may be used as one configuration for the CSI-RS. For example, a radio resource may be configured with one port CSI-RS being a TRS.

In the present embodiment, any one or more of the following uplink reference signals are used.

Demodulation Reference Signal (DMRS)
Phrase Tracking Reference Signal (PTRS)
Sounding reference signal (SRS)

The DMRS is used to demodulate a modulated signal. Note that two types of reference signals may be defined as the DMRS: a reference signal for demodulating the PUCCH and a reference signal for demodulating the PUSCH or that both reference signals may be referred to as the DMRS. The SRS is used for measurement of uplink Channel State Information (CSI), channel sounding, and beam management. The PTRS is used to track the phase in the time axis to ensure frequency offset due to phase noise.

The downlink physical channels and/or the downlink physical signals are collectively referred to as a downlink signal. The uplink physical channels and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

The BCH, the UL-SCH, and the DL-SCH are transport channels. A channel used in the Medium Access Control (MAC) layer is referred to as a transport channel. A unit of the transport channel used in the MAC layer is also referred to as a Transport Block (TB) and/or a MAC Protocol Data Unit (PDU). A Hybrid Automatic Repeat reQuest (HARQ)

is controlled for each transport block in the MAC layer. The transport block is a unit of data that the MAC layer delivers to the physical layer. In the physical layer, the transport block is mapped to a codeword, and coding processing is performed for each codeword.

The reference signal may also be used for Radio Resource Measurement (RRM). The reference signal may also be used for beam management.

The beam management may be a procedure of the base station apparatus 3 and/or the terminal apparatus 1 for matching directivity of an analog and/or digital beam in a transmission apparatus (the base station apparatus 3 in the downlink and the terminal apparatus 1 in the uplink) with directivity of an analog and/or digital beam in a reception apparatus (the terminal apparatus 1 in the downlink and the base station apparatus 3 in the uplink) to acquire a beam gain.

Note that a procedure described below may be included as a procedure for configuring, setting, or establishing a beam pair link.

Beam selection
Beam refinement
Beam recovery

For example, the beam selection may be a procedure for selecting a beam in communication between the base station apparatus 3 and the terminal apparatus 1. Furthermore, the beam refinement may be a procedure for selecting a beam having a higher gain or changing a beam to an optimum beam between the base station apparatus 3 and the terminal apparatus 1 according to the movement of the terminal apparatus 1. The beam recovery may be a procedure for re-selecting the beam in a case that the quality of a communication link is degraded due to blockage caused by a blocking object, a passing pedestrian, or the like in communication between the base station apparatus 3 and the terminal apparatus 1.

The beam management may include the beam selection and the beam refinement. The beam recovery may include the following procedures.

Detection of beam failure
Discovery of new beam
Transmission of beam recovery request
Monitoring of response to beam recovery request For example, in a case of selecting the transmission beam of the base station apparatus 3 in the terminal apparatus 1, Reference Signal Received Power (RSRP) of an SSS included in a CSI-RS or SS/PBCH block may be used, or the CSI may be used. A CSI-RS Resource Index (CRI) may be used as a report to the base station apparatus 3, or a time index broadcast on the PBCH included in the SS/PBCH block may be used.

The base station apparatus 3 indicates the time index of the CRI or SS/PBCH in indicating the beam to the terminal apparatus 1, and the terminal apparatus 1 performs reception based on the indicated time index of the CRI or SS/PBCH. At this time, the terminal apparatus 1 may configure a spatial filter based on the indicated time index of the CRI or SS/PBCH to perform reception. The terminal apparatus 1 may perform reception by use of a Quasi-Co-Location (QCL) assumption. A certain signal (such as antenna port, synchronization signal, reference signal) being in QCL with or QCL-assumed with another signal (such as antenna port, synchronization signal, reference signal) can be interpreted as that the certain signal is associated with relevant another signal.

In a case that a Long Term Property of a channel over which a symbol on an antenna port can is conveyed be inferred from a channel over which a symbol is carried on the other antenna port is conveyed, those two antenna ports are said to be in QCL. The long term property includes one or more of a delay spread, a Doppler spread, a Doppler shift, an average gain, and an average delay. For example, in a case that antenna port 1 and antenna port 2 are in QCL for an average delay, it is meant that a reception timing of antenna port 2 may be estimated from a reception timing of antenna port 1.

The QCL may also be expanded to beam management. For this purpose, spatially expanded QCL may be newly defined. For example, the long term property of a channel in spatial QCL assumption may be an Angle of Arrival (AoA), a Zenith angle of Arrival (ZoA), or the like and/or an angle spread, for example, Angle Spread of Arrival (ASA) or a Zenith angle Spread of Arrival (ZSA), a transmission angle (AoD, ZoD, or the like) or Angle Spread of the transmission angle, for example, an Angle Spread of Departure (ASD) or a Zenith angle Spread of Departure (ZSS), Spatial Correlation, or reception spatial parameters, in a radio link or channel.

For example, in a case that antenna port 1 and antenna port 2 are in QCL with respect to the reception spatial parameter, this means that a reception beam for receiving signals from antenna port 2 may be estimated from a reception beam (spatial filter) for receiving signals from antenna port 1.

According to this method, as the beam management and beam indication/report, the operations of the base station apparatus 3 and terminal apparatus 1 equivalent to the beam management may be defined by the spatial QCL assumption and the radio resource (time and/or frequency).

The subframe will now be described. The subframe in the present embodiment may also be referred to as a resource unit, a radio frame, a time period, or a time interval.

Figure 2:
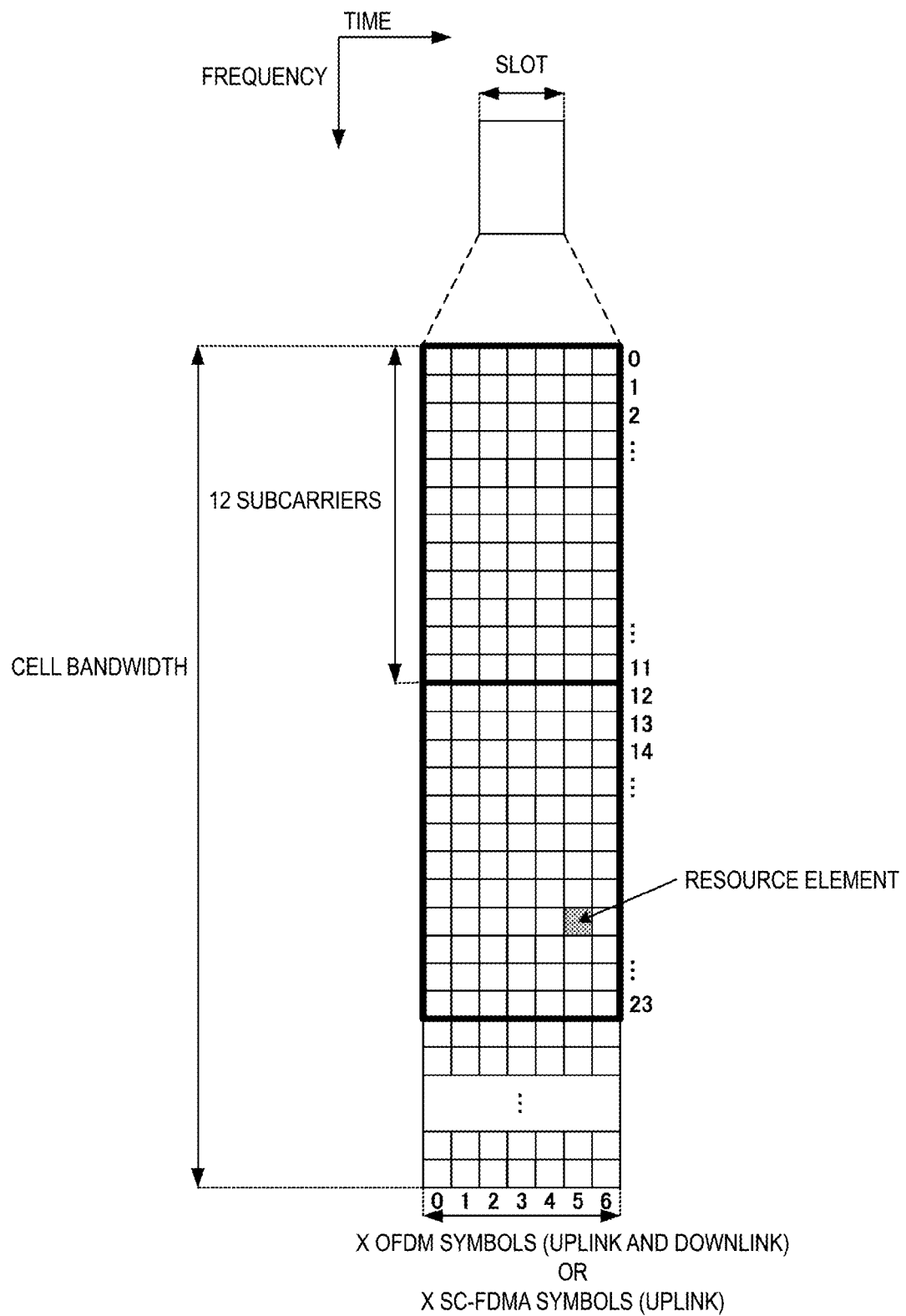
FIG. 2 is a diagram illustrating a schematic configuration of a downlink slot according to the present embodiment.

FIG. 2 is a diagram illustrating a schematic configuration of a downlink slot according to a first embodiment of the present invention. Each of the radio frames is 10 ms in length. Furthermore, each of the radio frames includes 10 subframes and W slots. For example, one slot includes X OFDM symbols. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 ad X=14 correspond to 0.5 ms and 1 ms, respectively. In addition, in a case that the subcarrier spacing is 60 kHz, X=7 or X=14, and X=7 and X=14 correspond to 0.125 ms and 0.25 ms, respectively. For example, in the case of X=14, W=10 for the subcarrier spacing being 15 kHz, and W=40 for the subcarrier spacing being 60 kHz. FIG. 2 illustrates a case of X=7 as an example. Note that a case of X=14 can be similarly configured by expanding the case of X=7. Furthermore, the uplink slot is defined similarly, and the downlink slot and the uplink slot may be defined separately. The bandwidth of the cell of FIG. 2 may also be defined as a part of band (BandWidth Part (BWP)). The slot may be defined as a Transmission Time Interval (TTI). The slot may not be defined as a TTI. The TTI may be a transmission period of the transport block.

The signal or the physical channel transmitted in each of the slots may be represented by a resource grid. The resource grid is defined by multiple subcarriers and multiple OFDM symbols. The number of subcarriers constituting one slot depends on each of the downlink and uplink bandwidths of a cell. Each element within the resource grid is referred to as a resource element. The resource element may be identified by using a subcarrier number and an OFDM symbol number.

A resource block is used to represent mapping of a certain physical downlink channel (such as the PDSCH) or a certain physical uplink channel (such as the PUSCH) to resource elements. As the resource block, a virtual resource block and a physical resource block are defined. A certain physical uplink channel is first mapped to a virtual resource block. Thereafter, the virtual resource block is mapped to a physical resource block. In a case that the number X of OFDM symbols included in a slot is 7 and NCPs are used, one physical resource block is defined by 7 continuous OFDM symbols in the time domain and by 12 continuous subcarriers in the frequency domain. Hence, one physical resource block includes (7×12) resource elements. In a case of Extended CPs (ECPs), one physical resource block is defined by, for example, 6 continuous OFDM symbols in the time domain and by 12 continuous subcarriers in the frequency domain. Hence, one physical resource block includes (6×12) resource elements. In this case, one physical resource block corresponds to one slot in the time domain and corresponds to 180 kHz in a case of a subcarrier spacing of 15 kHz (720 kHz in a case of 60 kHz) in the frequency domain. Physical resource blocks are numbered from 0 in the frequency domain.

Next, the subcarrier spacing configuration μ will be described. In NR, multiple OFDM numerologies are supported. In a certain BWP, the subcarrier spacing configuration μ (μ=0, 1, . . . , 5) and the cyclic prefix length are given by a higher layer for the downlink BWP and by a higher layer in the uplink BWP. Here, in a case that μ is given, a subcarrier spacing Δf is given by Δf=2^μ·15 (kHz).

In the subcarrier spacing configuration μ, the slots are counted in ascending order from 0 to N^{subframe, μ}_{slot}−1 within the subframe, and counted in ascending order from 0 to N^{frame, μ}_{slot}−1 within the frame. N^{slot}_{symb} continuous OFDM symbols are in the slots based on the slot configuration and cyclic prefix. N^{slot}_symb} is 7 or 14. The start of the slot n^{μ}_{s} in the subframe is temporally aligned with the start of the (n^{μ}_{s} N^{slot}_{symb})-th OFDM symbol in the same subframe.

Figure 3:
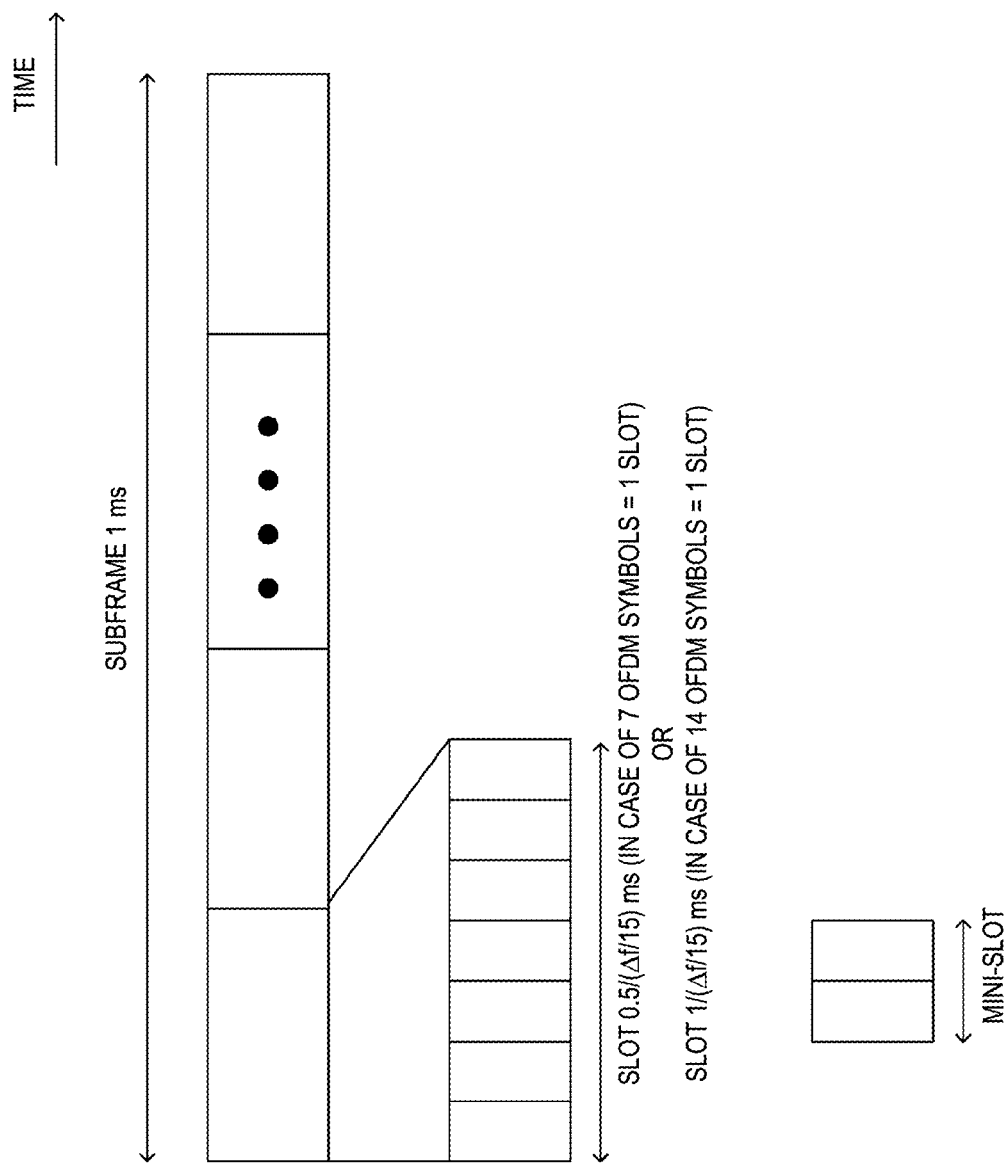
FIG. 3 is a diagram illustrating a relationship between a subframe and a slot and a mini-slot in a time domain.

The subframe, the slot, and a mini-slot will now be described. FIG. 3 is a diagram illustrating the relationship between the subframe and the slot and the mini-slot in the time domain. As illustrated in FIG. 3, three types of time units are defined. The subframe is 1 ms regardless of the subcarrier spacing. The number of OFDM symbols included in the slot is 7 or 14, and the slot length depends on the subcarrier spacing. Here, in a case that the subcarrier spacing is 15 kHz, 14 OFDM symbols are included in one subframe.

The mini-slot (which may be referred to as a sub-slot) is a time unit including OFDM symbols that are less in number than the OFDM symbols included in the slot. FIG. 3 illustrates, by way of example, a case in which the mini-slot includes two OFDM symbols. The OFDM symbols in the mini-slot may match the timing for the OFDM symbols constituting the slot. Note that the smallest unit of scheduling may be a slot or a mini-slot. Assigning a mini-slot may be referred to as non-slot based scheduling. A mini-slot being scheduled may be expressed as that a resource in which the relative time positions of the starting positions of the reference signal and the data are fixed is scheduled.

Figure 4:
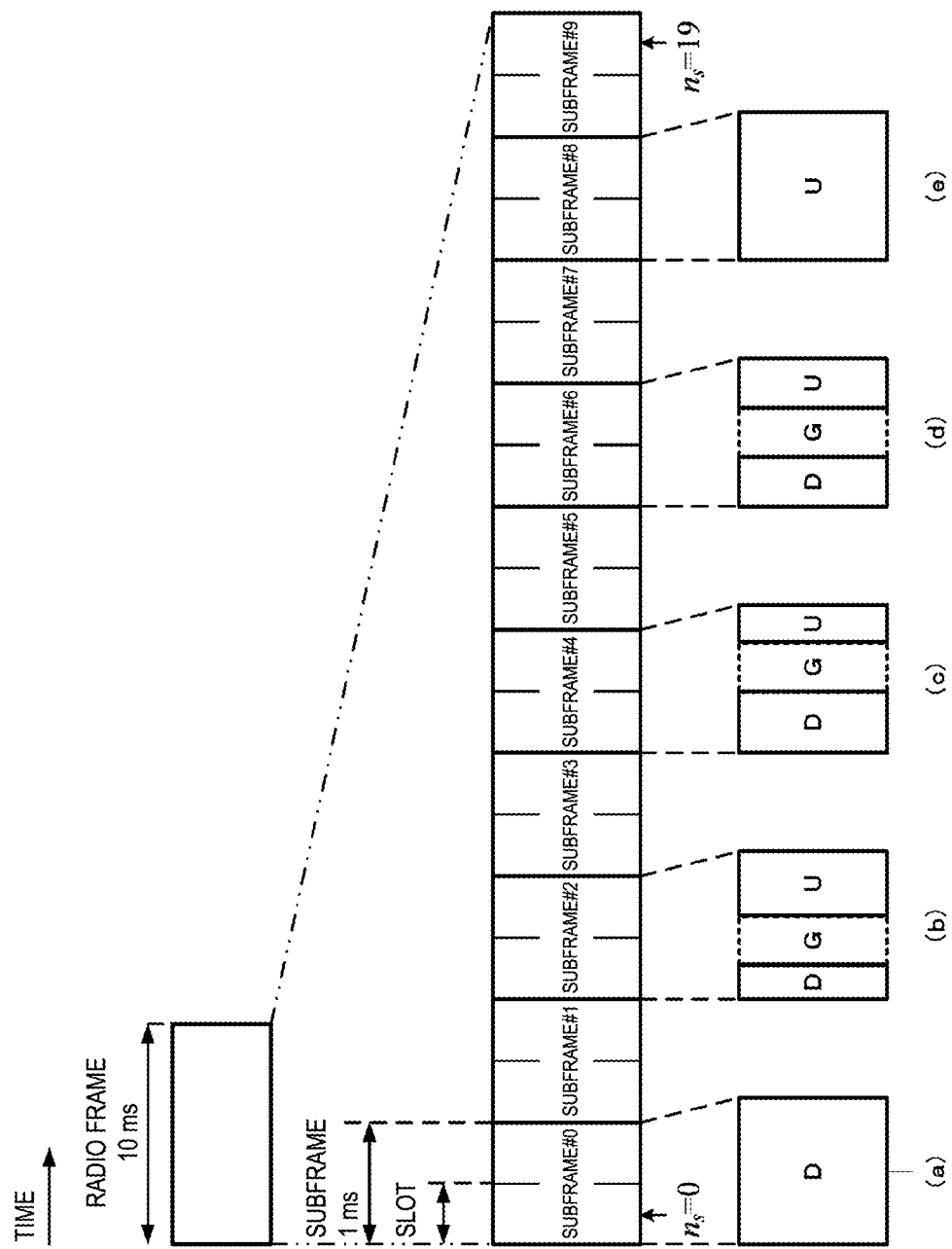
FIG. 4 is a diagram illustrating examples of a slot or a subframe.

FIG. 4 is a diagram illustrating an example of a slot or a subframe. Here, a case in which the slot length is 0.5 ms at a subcarrier spacing of 15 kHz is illustrated as an example. In FIG. 4, D represents the downlink, and U represents the uplink. As illustrated in FIG. 4, during a certain time period (for example, the minimum time period to be allocated to one UE in the system), the subframe may include one or more of the followings:

a downlink part (duration), a gap, and a uplink part (duration).

Note that a ratio of these may be predetermined as slot formats. The ratio of these may also be defined by the number of downlink OFDM symbols included in the slot or the start position and end position within the slot. The ratio of these may also be defined by the number of uplink OFDM symbols or DFT-S-OFDM symbols included in the slot, or the start position and end position within the slot. Note that the slot being scheduled may be expressed as that a resource in which the relative time positions of the reference signal and a slot boundary are fixed is scheduled.

FIG. 4(a) is an example in which in a certain time period (which may be referred to as, for example, a minimum unit of time resource that can be allocated to one UE, a time unit, or the like, or multiple minimum units of time resource may be bundled and referred to as a time unit) is entirely used for downlink transmission. FIG. 4(b) illustrates an example in which an uplink is scheduled via a PDCCH, for example, by using the first time resource, through a gap for a processing delay of the PDCCH, a time for switching from a downlink to an uplink, and generation of a transmit signal, and then, an uplink signal is transmitted. FIG. 4(c) illustrates an example in which the first time resource is used for a PDCCH and/or downlink PDSCH transmission, and then, through a gap for a processing delay, a time for switching from a downlink to an uplink, and generation of a transmit signal, a PUSCH or PUCCH is transmitted. Here, for example, the uplink signal may be used to transmit the HARQ-ACK and/or CSI, namely, the UCI. FIG. 4(d) illustrates an example in which the first time resource is used for a PDCCH and/or PDSCH transmission, and then, through a gap for a processing delay, a time for switching from a downlink to an uplink, and generation of a transmit signal, an uplink PUSCH and/or PUCCH is transmitted. Here, as an example, the uplink signal may be used to transmit the uplink data, namely, the UL-SCH. FIG. 4(e) illustrates an example in which the entire subframe is used for uplink transmission (PUSCH or PUCCH).

The above-described downlink part and uplink part may include multiple OFDM symbols as is the case with LTE.

Figure 5:
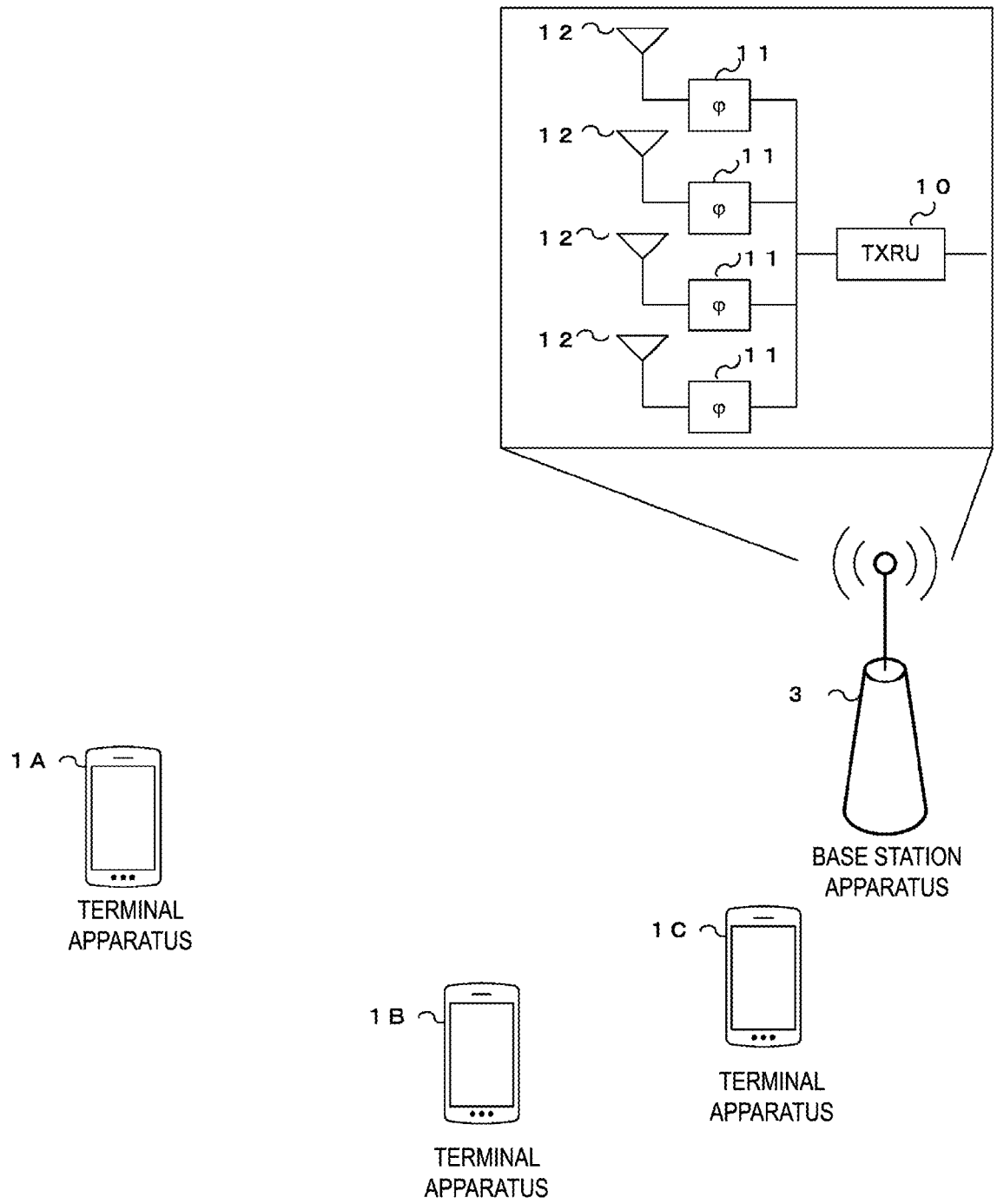
FIG. 5 is a diagram illustrating an example of beamforming.

FIG. 5 is a diagram illustrating an example of beamforming. Multiple antenna elements are connected to one Transceiver unit (TXRU) 10. The phase is controlled by using a phase shifter 11 for each antenna element and a transmission is performed from an antenna element 12, thus allowing a beam for a transmit signal to be directed in any direction. Typically, the TXRU may be defined as an antenna port, and only the antenna port may be defined for the terminal apparatus 1. Controlling the phase shifter 11 allows setting of directivity in any direction. Thus, the base station apparatus 3 can communicate with the terminal apparatus 1 by using a high gain beam.

The terminal apparatus 1 may use two waveforms of CP-OFDM and DFT-S-OFDM. The terminal apparatus 1 performs transmit power control in a case that the CP-OFDM and/or DFT-S-OFDM is used to transmit the physical uplink shared channel. The terminal apparatus 1 uses the CP-OFDM in a case that the transform precoding for the physical uplink shared channel is not enabled. The PUSCH for which the transform precoding is not enabled may be referred to as an OFDM based PUSCH. The terminal apparatus 1 uses the DFT-S-OFDM in a case that the transform precoding for the physical uplink shared channel is enabled. The PUSCH for which the transform precoding is enabled may be referred to as a DFT-S-OFDM based PUSCH. The transmit power of a serving cell c, a bandwidth part $c_b$ of the serving cell c (also referred to as serving BWP) ($c_b$ is hereinafter simply referred to as "c"), or a serving bandwidth part (also referred to as serving BWP) c is expressed by the following Equation. Note that the transform precoding may be to apply Discrete Fourier Transform (DFT). Whether to enable the transform precoding may be to switch between using the DFT-S-OFDM for the PUSCH an using the CP-OFDM for the PUSCH transmission. Whether the terminal apparatus 1 uses the PUSCH transmission for which the transform precoding is enabled or uses the PUSCH transmission for which the transform precoding is not enabled may be indicated by the base station apparatus 3 through the RRC signaling, the MAC CE, and/or the DCI. The CP-OFDM and/or the DFT-S-OFDM may be switched through the RRC signaling, the MAC CE, and/or the DCI. The base station apparatus 3 may configure any one or both of the waveforms for the terminal apparatus 1 through the RRC and switch the waveforms through the DCI.

However, $P\hat{}_{cmax, c}$ represents a linear value of $P_{cmax, c}$ and $P\hat{}_{PUCCH}(i)$ represents a linear value of the PUCCH transmit power in the slot i.

That is, in some other circumstances (e.g., a case that the PUCCH is transmitted in the same slot), the PUSCH transmit power (dBm) in the i-th slot in the c-th serving cell or serving BWP is calculated based on $P\hat{}_{cmax, c}$, $P\hat{}_{PUCCH}(i)$ $M_{PUSCH, c}(i)$, $P_{O\_PUSCH, c}(j)$, $\alpha_c(j)$, $PL_c$, $\Delta_{TF, c}$, and $f_c(i)$, or the like.

Next, a power headroom report will be described. The power headroom in a case that the terminal apparatus 1 transmits the PUSCH without the PUCCH in the subframe i in the c-th serving cell or serving BWP is calculated by the following equation.

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\} \quad \text{[Equation 3]}$$

$P_{type1,c}(i)$ represents a power headroom in a case that the terminal apparatus 1 transmits the PUSCH without the PUCCH in the c-th serving cell or serving BWP in the i-th subframe. That is, in some circumstances, the power headroom in the i-th slot in the c-th serving cell or serving BWP is calculated based on $P_{cmax, c}$, $M_{PUSCH, c}(i)$, $P_{O\_PUSCH, c}(j)$, $\alpha_c(j)$, $PL_c$, $\Delta_{TF, c}$, and $f_c(i)$, or the like.

$$P_{PUSCH_c}(i) = \min \begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} \quad \text{[Equation 1]}$$

$P_{PUSCH, c}(i)$ represents a PUSCH transmit power (dBm) in the i-th slot in the c-th serving cell or serving BWP, and j represents a parameter related to the type of the PUSCH. For example, a case of j=0 represents semi-persistent scheduling, a case of j=1 represents dynamic scheduling, and a case of j=2 represents random access response grant transmission.

$P_{cmax, c}$ represents the maximum transmit power in the c-th serving cell or serving BWP, and $M_{PUSCH, c}(i)$ represents the bandwidth of PUSCH resource allocation represented by the number of valid resource blocks (scheduled) for the i-th slot in the c-th serving cell or serving BWP. $P_{O\_PUSCH, c}(j)$ represents a cell-specific and/or user-specific power given by a higher layer, and $\alpha_c(j)$ represents a path loss compensation factor expressed between 0 and 1 given by the higher layer, and $PL_c$ represents a path loss estimation value estimated from SS blocks (PSS, SSS, PBCH, etc.) or CSI-RS in the c-th serving cell or serving BWP. $\Delta_{TF, c}$ represents power correction given in a case of being indicated by the higher layer or in a case the UCI is multiplexed, and $f_c(i)$ represents a correction value or cumulative value in the i-th slot by a Transmission Power Control (TPC) command indicated by the DCI.

That is, in some circumstances (e.g., a case that the PUCCH is not transmitted in the same slot), the PUSCH transmit power (dBm) in the i-th slot in the c-th serving cell or serving BWP is calculated based on $P_{cmax, c}$, $M_{PUSCH, c}(i)$, $P_{O\_PUSCH, c}(j)$, $\alpha_c(j)$, $PL_c$, $\Delta_{TF, c}$, and $f_c(i)$, or the like.

In a case that the PUCCH is transmitted in the same slot, the transmit power is given by the following equation.

Next, a power headroom report will be described. The power headroom in a case that the terminal apparatus 1 does not transmit the PUSCH in the c-th serving cell or serving BWP in the subframe i is expressed by the following equation.

$$PH_{type1,c}(i) = \tilde{P}_{CMAX,c}(i) - \{P_{O\_PUSCH,c}(1) + \alpha_c(1) \cdot PL_c + f_c(i)\} \quad \text{[Equation 4]}$$

Here, $P\hat{}_{cmax, c}$ is calculated assuming Maximum Power Reduction (MPR), Additional MPR (A-MPR, Power Management term for MPR (P-MPR), and ΔTc of zero decibels (0 dB). This is equivalent to Equation 3 in which $M_{PUSCH, c}(i)$ is 1 and j is 1. Specifically, the number of valid resource blocks for the i-th slot in the c-th serving cell or serving BWP is 1. In other words, the power headroom is calculated not based on the PUSCH resource allocation bandwidth. Note that this may be referred to as a reference format (or virtual format). Note that, hereinafter, a power headroom calculated according to Equation 3 or 4 is referred to as a power headroom value.

Next, a trigger of the power head room report will be described.

A procedure of the power headroom report is used to provide information on a difference between nominal maximum transmit power of the terminal apparatus 1 to the serving base station and power estimated for UL-SCH transmit power for each activated serving cell or serving BWP, and a difference between the nominal maximum transmit power of the terminal apparatus 1 and power estimated for the UL-SCH and PUCCH in an SpCell and PUCCH SCell.

$$P_{PUSCH_c}(i) = \min \begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} \quad \text{[Equation 2]}$$

The RRC layer controls the power headroom report by configuring two timers (periodicPHR-Timer and prohibitPHR-Timer) and a prescribed value (dl-Pathloss-Change) setting a change in the power back-off required by the measured downlink path loss and power management. periodicPHR-Timer is a timer for periodically reporting the PHR. prohibitPHR-Timer is a timer for prohibiting the power headroom report until it expires.

In an TTI, a power headroom report is triggered in a case that any event in the next event occurs.

(1) prohibitPHR-Timer expires or has expired and in a case that uplink resources for new transmission is provided in at least one serving cell or serving BWP of any MAC entity which is used as a path loss reference, the path loss has changed more than a prescribed value (dl-PathlossChange) decibels (dB) from the last transmission of a PHR in this MAC entity.

(2) periodicPHR-Timer expires.

(3) Configuration and reconfiguration of power headroom function by higher layer not disabling function.

(4) Activation of SCell in which uplink is configured.

(5) Addition of the PSCell.

(6) prohibitPHR-Timer expires or has expired, and that uplink resources for new transmission is provided, the following condition is true in this TTI for any of the activated serving cells or serving BWPs of any MAC entity with configured uplink:

There is an uplink resource or PUCCH resource allocated for transmission in the cell or BWP, and the power back-off required by power management has changed in the path loss from the last power headroom report at the cell or BWP to a greater change than the dl-PathlossChange decibels (dB).

(7) Waveform for PUSCH transmission is switched.

(8) Transform precoding for physical uplink shared channel was reconfigured.

Next, the operation of the MAC entity will be described.

In a certain TTI, in a case that the MAC entity has uplink resources allocated for new transmission for the TTI, the MAC entity performs the following operations.

(1) In a case that it (the uplink resource allocated for the new transmission) is the first new transmission uplink resource since the last MAC reset, periodicPHR-Timer is started.

(2) In a case that the power headroom report procedure is triggered by at least one PHR and is not cancelled, and a PHR configured to be transmitted by the MAC entity can be accommodated with its sub-header as a result of the logical channel priority, the power headroom is transmitted.

Specifically, in a case that any of the following trigger conditions is met, the MAC layer of the terminal apparatus 1 determines a report timing of the power headroom, and transmits the power headroom to the base station apparatus by using the MAC control element included in a control header portion of the transmission data. The trigger condition may be such that (1) a case that the PH report prohibit timer (prohibit PHR timer) is stopped and that the path loss value of the serving cell has degraded by a prescribed value or more in a case that the PH is reported last time; (2) a case that the PH period timer (Periodic PHR timer) expires, (3) a case that the configuration of the power headroom is changed, and (4) a case that the secondary cell or the secondary BWP is activated.

An aspect of the present invention will be described. The terminal apparatus supports two waveforms of CP-OFDM and DFT-S-OFDM. Here, there may be cases in which only one of the waveforms is used or there may be cases where both the waveforms are used, depending on the network or the cell.

In a case that both of the waveforms are supported by the network, the base station apparatus 3 configures which waveform is used to perform communication with each terminal apparatus 1 by means of user-specific RRC signaling or DCI. Note that a waveform may be broadcast to the terminal apparatus 1 using system information (e.g., RACH configuration) such as the transmission of message 3. Message 3 includes C-RNTI MAC CE or CCCH SDU, and is a message submitted from a higher layer and transmitted at UL-SCH associated with a contention resolution identity of the terminal apparatus 1 as part of a random access procedure.

The terminal apparatus 1 is assigned with multiple $P_{O\_PUSCH, c}$ and $\alpha_c$, and is configured to link to each waveform. For example, assuming that $P_{O\_PUSCH, c}=P_{O\_OFDM}$ and $\alpha_c=\alpha_{OFDM}$ are parameters configured to be linked to CP-OFDM, $P_{O\_PUSCH, c}=P_{O\_DFT}$, and $\alpha_c=\alpha_{DFT}$ are parameters configured to be linked to DFT-S-OFDM, in a case that the CP-OFDM is configured for PUSCH transmission, a power headroom according to Equation 3 or 4 is calculated based on whether the PUSCH is allocated using $P_{O\_OFDM}$ and/or $\alpha_{OFDM}$. On the other hand, for DFT-S-OFDM that is not configured to be used for PUSCH transmission, $P_{O\_DFT}$ and/or $\alpha_{DFT}$ may be used to report using the reference format expressed by Equation 4.

Next, a case that the transmission back-off due to the difference in the waveforms (reduction amount of transmit power) is different, which is reflected to $P_{cmax, c}$, is described. In a case that CP-OFDM is configured for PUSCH transmission, a power headroom according to Equation 3 or 4 is calculated based on whether the PUSCH is allocated. On the other hand, for DFT-S-OFDM that is not configured to be used for PUSCH transmission, the reference format expressed by Equation 4 may be used to report. At this time, $P\tilde{}_{cmax, c}$ with the transmission back-off subtracted due to the waveform may be used for the transmission back-off with $P\tilde{}_{cmax, c}$ not assuming that at least one of MPR, A-MPR, P-MPR, and ΔTc is 0 decibel.

The trigger conditions (periodicPHR-Timer, prohibitPHR-Timer, and/or dl-PathlossChange) may be configured for each waveform to transmit a PHR of each waveform.

Next, a case that the base station is configured to use only any waveform will be described. The base station apparatus 3 configures, for the terminal apparatus 1, a waveform to be used for PUSCH transmission using RRC signaling or system information, and the terminal apparatus 1 transmits the PUSCH in the configured waveform. At this time, the value of the power headroom for the configured waveform is calculated.

Next, a case that one or more SRS resources are configured will be described. The base station apparatus 3 configures multiple SRS resources for the terminal apparatus 1. The multiple SRS resources are associated with multiple symbols in the back of the uplink slot. For example, suppose that four SRS resources are configured and each SRS resource is associated with each symbol of four symbols in the back of the slot. The terminal apparatus 1 may transmit using a transmission beam (transmission filter) independent of each other for the respective SRS symbols.

Figure 6:
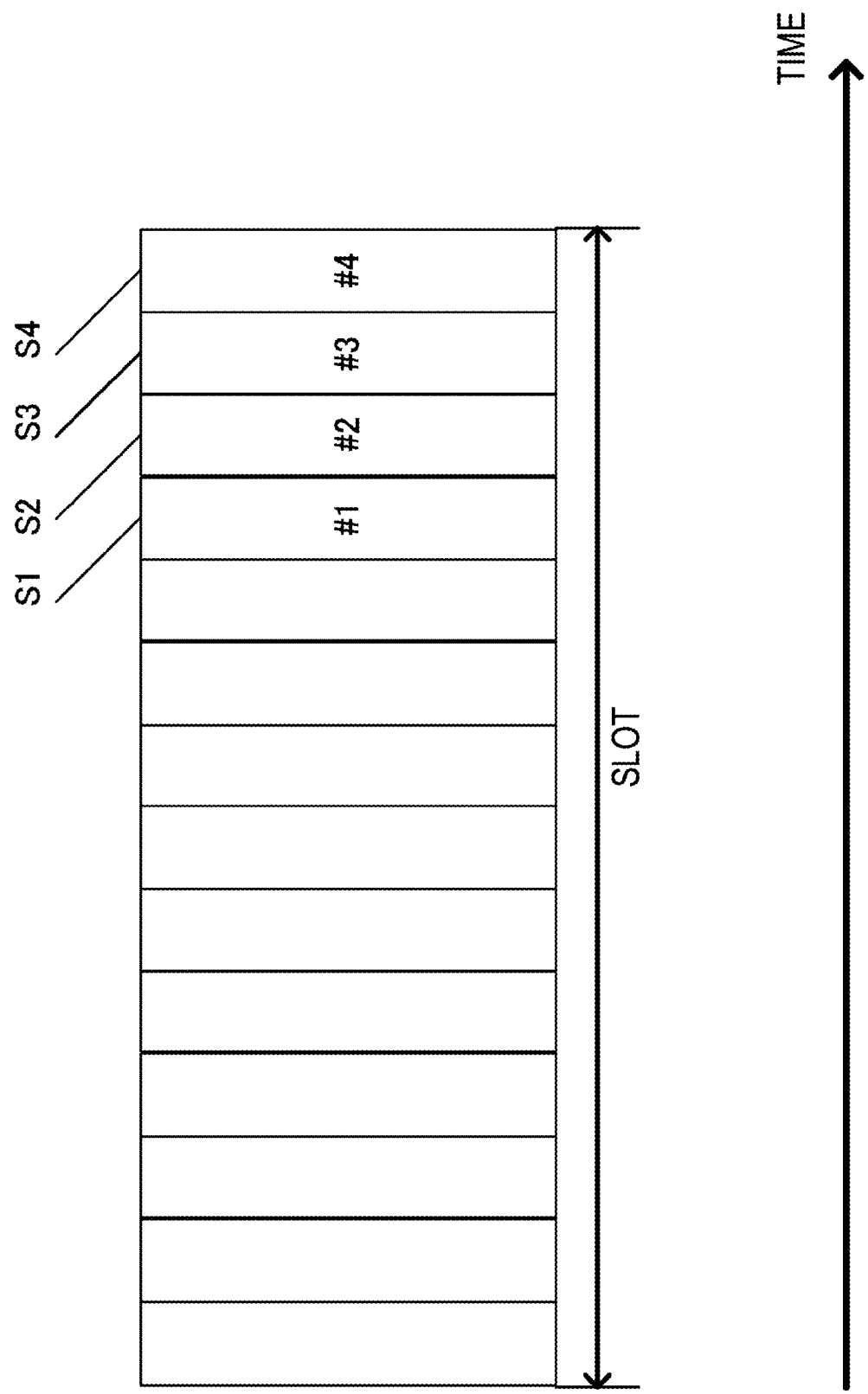
FIG. 6 is a diagram illustrating an example of an SRS resource.

FIG. 6 illustrates an example of the SRS symbols in a case that four SRS resources are configured. S1 represents an SRS resource associated with SRS resource #1, S2 represents an SRS resource associated with SRS resource #2, S3 represents an SRS resource associated with SRS resource #3, and S4 represents is an SRS resource associated with SRS resource #4. The terminal apparatus 1 applies each transmission beam to each of the respective resources based on the configuration to transmit the SRS.

The terminal apparatus 1 may use different transmit antenna ports for the respective SRS resources to perform transmission. For example, the terminal apparatus 1 may use antenna port 10 for S1, antenna port 11 for S2, antenna port 12 for S3, and antenna port 13 for S4 to transmit the SRS.

The terminal apparatus 1 may use multiple transmit antenna ports or a transmit antenna port group for each of the SRS resources to transmit the SRS. For example, the terminal apparatus 1 may use the antenna ports 10 and 11 for S1, and the antenna ports 12 and 13 for S2 to transmit the SRS.

The terminal apparatus 1 may use the same port for the respective SRS resources with changing the transmission beam to transmit the SRS. For example, the terminal apparatus 1 may use the transmit antennas 10 and 11 for S1, and the antenna ports 10 and 11 for S2 with changing the transmission beam for each resource to transmit the SRS.

The resource configuration of sounding reference signal may include at least one or more of the following information elements.

(1) Information or index relating to symbols for transmitting the sounding reference signal (2) Information regarding antenna ports for transmitting the sounding reference signal (3) Frequency hopping pattern of the sounding reference signal The base station apparatus 3 may select one or more of the respective configured SRS resources to indicate, for PUSCH transmission, an SRS Resource Index (SRI), an index associated with the SRS resource, or an index associated with the SRI to the terminal apparatus 1 through the DCI, the MAC CE, or the RRC signaling. The terminal apparatus 1 may receive the SRS Resource Index (SRI), the index associated with the SRS resource, or the index associated with the SRI among the respective configured SRS resources from the base station apparatus 3 through the DCI, the MAC CE, or the RRC signaling. The terminal apparatus 1 performs the PUSCH transmission using one or more antenna ports for demodulation reference signals (DMRS) and/or one or more antenna ports for the PUSCH, associated with designated SRS resource. For example, in a case that the terminal apparatus 1 transmits the SRS using transmission beams #1 to #4 for four SRS resources, and SRS resource #2 is indicated as SRI from the base station apparatus 3, the terminal apparatus 1 may transmit the PUSCH by using transmission beam #2. In a case that multiple SRS resources are indicated, the PUSCH may be transmitted by Multiple Input Multiple Output Spatial Multiplexing (MIMO SM), using multiple transmission beams used for the SRS resources associated with indicated SRI.

The base station apparatus 3 may select one or more of the respective configured SRS resources to indicate, for PUCCH transmission, an SRS Resource Index (SRI), an index associated with the SRS resource, or an index associated with the SRI to the terminal apparatus 1 through the DCI, the MAC CE, or the RRC signaling. Information for identifying the SRS resource associated with the PUCCH is included in the DCI for performing downlink resource allocation. The terminal apparatus 1 decodes PDSCH, based on the DCI for performing the downlink resource allocation, and transmits a HARQ-ACK on a PUCCH resource indicated by the DCI for performing the downlink resource allocation. The terminal apparatus 1 may receive the SRS Resource Index (SRI), the index associated with the SRS resource, or the index associated with the SRI among the respective configured SRS resources from the base station apparatus 3 through the DCI, the MAC CE, or the RRC signaling. The terminal apparatus 1 performs the PUCCH transmission using one or more antenna ports for demodulation reference signals (DMRS) and/or one or more antenna ports for the PUCCH associated with designated SRS resource.

The power headroom may be transmitted for each SRS resource. For example, in a case that the base station apparatus 3 configures one or more SRS resources for the terminal apparatus 1, the MAC entity of the terminal apparatus 1 may trigger the power headroom report for each configured SRS resource. The MAC entity of the terminal apparatus 1 may calculate a power headroom for each configured SRS resource. Each SRS resource corresponds to a power headroom for PUSCH transmission associated with the SRS resource. The MAC entity of the terminal apparatus 1 may transmit a power headroom MAC CE including power headroom values of the number of configured SRS resources.

The base station apparatus 1 may configure a trigger condition of the power headroom report for each SRS resource for the terminal apparatus 3. For example, the base station apparatus 1 may configure a reporting period of PHR for each SRS resource with a reporting inhibit period. In a case that the terminal apparatus 1 calculates the value of the power headroom, for transmission of PUSCH based on the indicated SRI, the terminal apparatus 1 may use Equations 3 and 4 based on whether there is PUSCH allocation, and for PUSCH associated with the SRI not indicated, the terminal apparatus 1 may use the reference format (Equation 4).

In a case that the last SRI and the indicated SRI from the base station apparatus 1 to the terminal apparatus 3 are different from each other, the MAC entity of the terminal apparatus 3 may trigger the power headroom report.

Next, the power headroom MAC CE is described. The power headroom MAC CE is recognized (identified) by a MAC PDU sub-header. The MAC CE includes a field called a power headroom (PH) and indicates a power headroom level with a prescribed bit length (e.g., 6 bits). The power headroom level may be defined for each prescribed range. For example, in LTE, 64 levels between −23 dB and 40 dB in increments of 1 decibel may be defined for the power headroom, and a PH corresponding to the value calculated based on Equation 3 or 4 may be defined as a MAC CE. An information field may be defined to indicate whether the PHR is an actual transmission or a reference format. The base station apparatus 1 may configure multiple $P_{O\_PUSCH,\,c}$ and $\alpha_c$ for the terminal apparatus 3, and associate the configured terms with the respective SRS resources.

In other words, the terminal apparatus 1 receives information to configure whether transform precoding for the physical uplink shared channel is enabled, and transmits information indicating the power headroom level for the PUSCH with the transform precoding enabled and information indicating the power headroom level for the physical uplink shared channel with the transform precoding not enabled.

At this time, in a case that the transform precoding for the PUSCH is enabled, the terminal apparatus 1 may calculate the information indicating the power headroom level for the PUSCH with the transform precoding enabled based on the number of scheduled effective resource blocks, and may calculate the power headroom level for the physical uplink shared channel with the transform precoding not enabled in a reference format.

At this time, in a case that the transform precoding for the PUSCH is not enabled, the terminal apparatus 1 may calculate the information indicating the power headroom level for the PUSCH with the transform precoding not enabled based on the number of scheduled effective resource blocks, and may calculate the information indicating the power headroom level for the physical uplink shared channel with the transform precoding enabled in the reference format.

At this time, in a case that the transform precoding for the PUSCH is not enabled, the terminal apparatus 1 may calculate the information indicating the power headroom level for the PUSCH with the transform precoding not enabled based on the number of scheduled effective resource blocks, and may calculate the power headroom level for the physical uplink shared channel with the transform precoding enabled in the reference format.

Specifically, the terminal apparatus may receive information including a resource configuration of one or multiple sounding reference signals, transmit information indicating a power headroom level for an uplink shared channel associated with SRI included in DCI included in the PDCCH, and transmit information indicating a power headroom level for an uplink shared channel associated with SRI not included in DCI included in (or carried by) the PDCCH.

At this time, the terminal apparatus 1 may calculate the information indicating the power headroom level for the uplink shared channel associated with the SRI included in the DCI included in the PDCCH, based on the number of scheduled effective resource blocks, and calculate the information indicating the power headroom level for the uplink shared channel associated with the SRI not included in the DCI included in the PDCCH in a reference format.

An aspect of the present embodiment may be operated in carrier aggregation or dual connectivity with the Radio Access Technologies (RAT) such as LTE and LTE-A/LTE-A Pro. In this case, the aspect may be used for some or all of the cells or cell groups, or the carriers or carrier groups (e.g., Primary Cells (PCells), Secondary Cells (SCells), Primary Secondary Cells (PSCells), Master Cell Groups (MCGs), or Secondary Cell Groups (SCGs)). Moreover, the aspect may be independently operated and used in a stand-alone manner. In the dual connectivity operation, a Special Cell (SpCell) is referred to as a PCell of an MCG or a PSCell of an SCG, respectively, depending on whether the MAC entity is associated with the MCG or the SCG. Other than in the dual connectivity operation, a Special Cell (SpCell) is referred to as a PCell. The Special Cell (SpCell) supports a PUCCH transmission and a contention based random access.

Configurations of apparatuses according to the present embodiment will be described below. Here, an example is illustrated in which CP-OFDM is applied as a downlink radio transmission scheme, and CP-OFDM or DFTS-OFDM (SC-FDM) is applied as an uplink radio transmission scheme.

Figure 7:
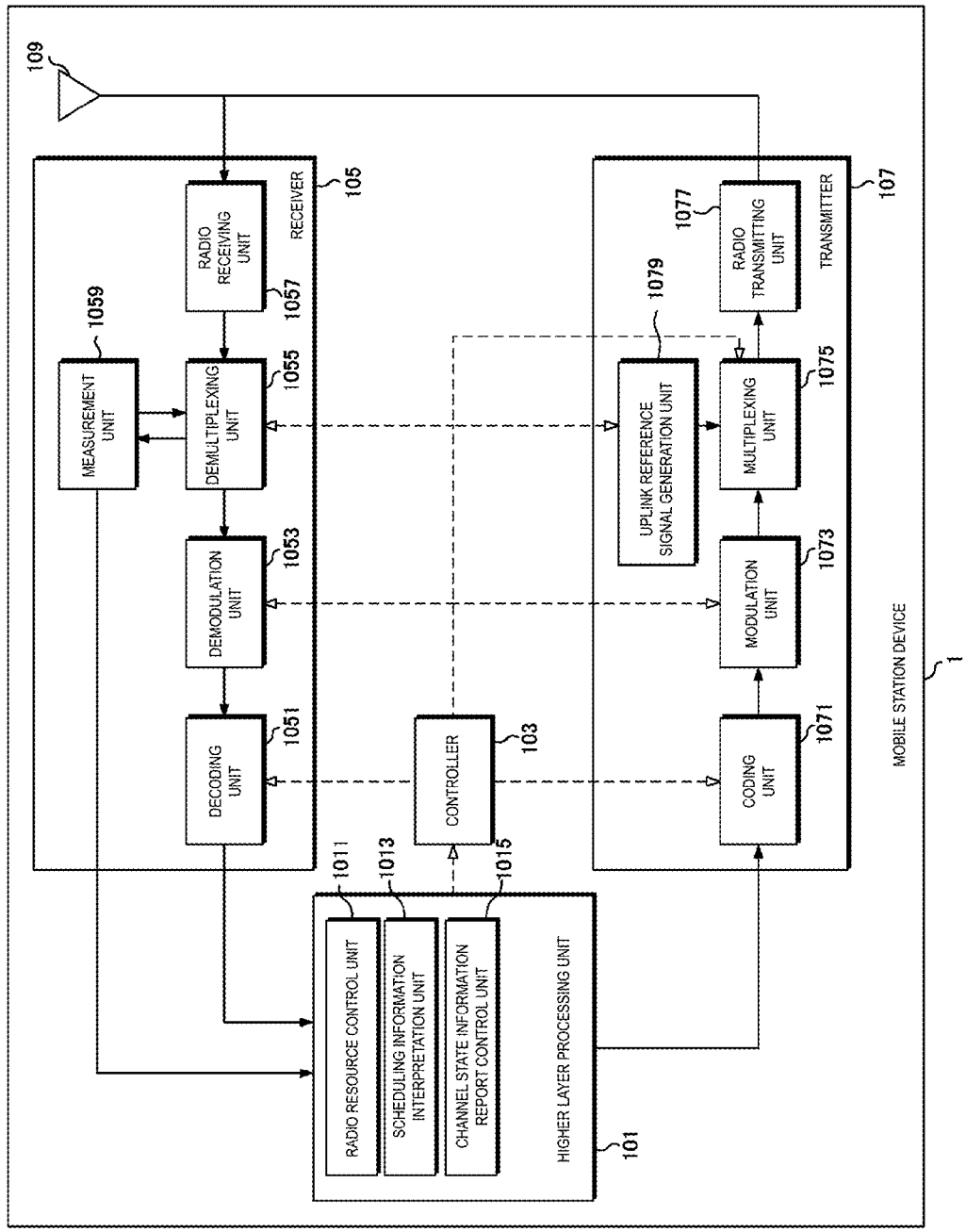
FIG. 7 is a schematic block diagram illustrating a configuration of a terminal apparatus 1 according to the present embodiment.

FIG. 7 is a schematic block diagram illustrating a configuration of the terminal apparatus 1 according to the present embodiment. As illustrated in the figure, the terminal apparatus 1 includes a higher layer processing unit 101, a controller 103, a receiver 105, a transmitter 107, and a transmit and/or receive antenna 109. Furthermore, the higher layer processing unit 101 is configured to include a radio resource control unit 1011, a scheduling information interpretation unit 1013, and a Channel State Information (CSI) report control unit 1015. Furthermore, the receiver 105 is configured to include a decoding unit 1051, a demodulation unit 1053, a demultiplexing unit 1055, a radio receiving unit 1057, and a measurement unit 1059. The transmitter 107 includes a coding unit 1071, a modulation unit 1073, a multiplexing unit 1075, a radio transmitting unit 1077, and an uplink reference signal generation unit 1079.

The higher layer processing unit 101 outputs the uplink data (the transport block) generated by a user operation or the like, to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various pieces of configuration information of the terminal apparatus 1. The radio resource control unit 1011 generates information to be mapped to each uplink channel, and outputs the generated information to the transmitter 107.

The scheduling information interpretation unit 1013 included in the higher layer processing unit 101 interprets the DCI format (scheduling information) received through the receiver 105, generates control information for control of the receiver 105 and the transmitter 107, in accordance with a result of interpreting the DCI format, and outputs the generated control information to the controller 103.

The CSI report control unit 1015 indicates to the measurement unit 1059 to derive Channel State Information (RI/PMI/CQI/CRI) relating to the CSI reference resource. The CSI report control unit 1015 indicates to the transmitter 107 to transmit RI/PMI/CQI/CRI. The CSI report control unit 1015 sets a configuration that is used in a case that the measurement unit 1059 calculates CQI.

In accordance with the control information from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and/or receive antenna 109, and outputs the decoded information to the higher layer processing unit 101.

The radio receiving unit 1057 converts (down-converts) a downlink signal received through the transmit and/or receive antenna 109 into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiving unit 1057 removes a portion corresponding to a Guard Interval (GI) from the digital signal resulting from the conversion, performs Fast Fourier Transform (FFT) on the signal from which the Guard Interval has been removed, and extracts a signal in the frequency domain.

The demultiplexing unit 1055 demultiplexes the extracted signal into the downlink PDCCH or PDSCH, and the downlink reference signal. The demultiplexing unit 1055 performs compensation of channel on the PDCCH and the PUSCH, from a channel estimate value input from the measurement unit 1059. Furthermore, the demultiplexing unit 1055 outputs the downlink reference signal resulting from the demultiplexing, to the measurement unit 1059.

The demodulation unit 1053 demodulates the downlink PDCCH and outputs a resulting of the demodulation to the decoding unit 1051. The decoding unit 1051 attempts to decode the PDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), 64 QAM, or 256 QAM and outputs a signal resulting from the demodulation to the decoding unit 1051. The decoding unit 1051 performs decoding in accordance with information of a transmission or an original coding rate notified with the downlink control information, and outputs, to the higher layer processing unit 101, the downlink data (the transport block) resulting from the decoding.

The measurement unit 1059 performs downlink path loss measurement, channel measurement, and/or interference measurement from the downlink reference signal input from the demultiplexing unit 1055. The measurement unit 1059 outputs, to the higher layer processing unit 101, the measurement result and CSI calculated based on the measurement result. Furthermore, the measurement unit 1059 calculates a downlink channel estimate value from the downlink reference signal and outputs the calculated downlink channel estimate value to the demultiplexing unit 1055.

The transmitter 107 generates the uplink reference signal in accordance with the control signal input from the controller 103, codes and modulates the uplink data (the transport block) input from the higher layer processing unit 101, multiplexes the PUCCH, the PUSCH, and the generated uplink reference signal, and transmits a signal resulting from the multiplexing to the base station apparatus 3 through the transmit and/or receive antenna 109.

The coding unit 1071 codes the Uplink Control Information and the uplink data input from the higher layer processing unit 101. The modulation unit 1073 modulates the coded bits input from the coding unit 1071, in compliance with a modulation scheme such as BPSK, QPSK, 16 QAM, 64 QAM, or 256 QAM.

The uplink reference signal generation unit 1079 generates a sequence determined according to a prescribed rule (formula), based on a physical cell identity (also referred to as a physical cell identity (PCI), a Cell ID, or the like) for identifying the base station apparatus 3, a bandwidth in which the uplink reference signal is mapped, a cyclic shift notified with the uplink grant, a parameter value for generation of a DMRS sequence, and the like.

Based on the information used for the scheduling of the PUSCH, the multiplexing unit 1075 determines the number of PUSCH layers to be spatially-multiplexed, maps multiple pieces of uplink data to be transmitted on the same PUSCH to multiple layers through Multiple Input Multiple Output Spatial Multiplexing (MIMO SM), and performs precoding on the layers.

In accordance with the control signal input from the controller 103, the multiplexing unit 1075 performs Discrete Fourier Transform (DFT) on modulation symbols of PUSCH. The multiplexing unit 1075 multiplexes PUCCH and/or PUSCH signals and the generated uplink reference signal for each transmit antenna port. To be more specific, the multiplexing unit 1075 maps the PUCCH and/or PUSCH signals and the generated uplink reference signal to the resource elements for each transmit antenna port.

The radio transmitting unit 1077 performs Inverse Fast Fourier Transform (IFFT) on a signal resulting from the multiplexing to perform modulation in compliance with an SC-FDM scheme, adds the guard interval to the SC-FDM-modulated SC-FDM symbol to generate a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 109 for transmission.

Figure 8:
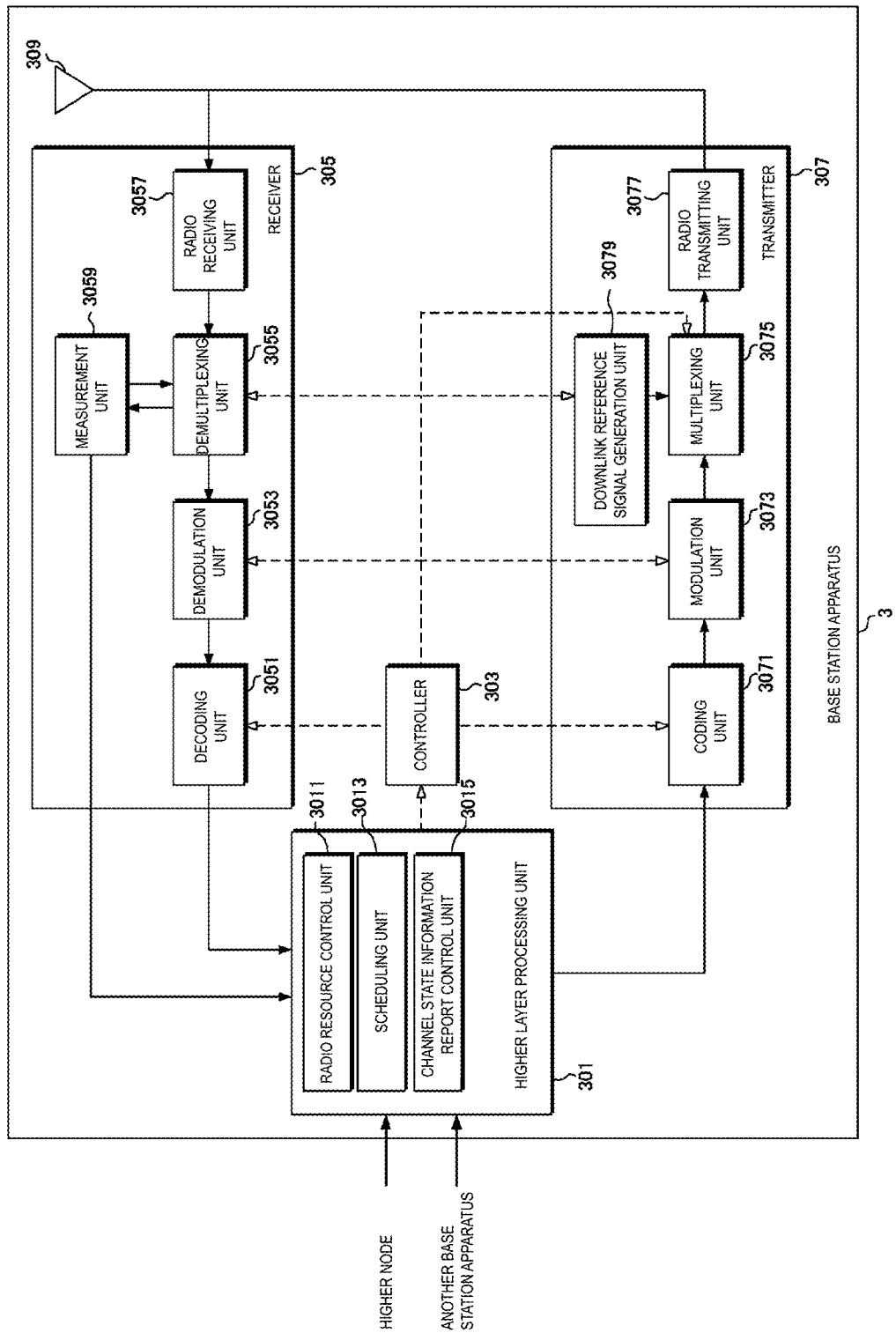
FIG. 8 is a schematic block diagram illustrating a configuration of a base station apparatus 3 according to the present embodiment.

FIG. 8 is a schematic block diagram illustrating a configuration of the base station apparatus 3 according to the present embodiment. As is illustrated, the base station apparatus 3 is configured to include a higher layer processing unit 301, a controller 303, a receiver 305, a transmitter 307, and a transmit and/or receive antenna 309. The higher layer processing unit 301 is configured to include a radio resource control unit 3011, a scheduling unit 3013, and a CSI report control unit 3015. The receiver 305 is configured to include a decoding unit 3051, a demodulation unit 3053, a demultiplexing unit 3055, a radio receiving unit 3057, and a measurement unit 3059. The transmitter 307 includes a coding unit 3071, a modulation unit 3073, a multiplexing unit 3075, a radio transmitting unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, the downlink data (the transport block) mapped to the downlink PDSCH, system information, the RRC message, the MAC Control Element (CE), and the like, and outputs a result of the generation or the acquirement to the transmitter 307. Furthermore, the radio resource control unit 3011 manages various configuration information for each of the terminal apparatuses 1.

The scheduling unit 3013 included in the higher layer processing unit 301 determines a frequency and a subframe to which the physical channels (PDSCH and PUSCH) are allocated, the transmission coding rate and modulation scheme for the physical channels (PDSCH and PUSCH), the transmit power, and the like, from the received CSI and from the channel estimate value, channel quality, or the like input from the measurement unit 3059. The scheduling unit 3013 generates the control information for control of the receiver 305 and the transmitter 307 in accordance with a result of the scheduling, and outputs the generated information to the controller 303. The scheduling unit 3013 generates the information (e.g., the DCI format) to be used for the scheduling of the physical channels (PDSCH or PUSCH), based on the result of the scheduling.

The CSI report control unit 3015 included in the higher layer processing unit 301 controls a CSI report to be performed by the terminal apparatus 1. The CSI report control unit 3015 transmits information, assumed in order for the terminal apparatus 1 to derive RI/PMI/CQI in the CSI reference resource, for indicating various configurations, to the terminal apparatus 1 through the transmitter 307.

Based on the control information from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and/or receive antenna 309, and outputs information resulting from the decoding to the higher layer processing unit 301. The radio receiving unit 3057 converts (down-converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 3057 removes a portion corresponding to the Guard Interval (GI) from the digital signal resulting from the conversion. The radio receiving unit 3057 performs Fast Fourier Transform (FFT) on the signal from which the Guard Interval has been removed, extracts a signal in the frequency domain, and outputs the resulting signal to the demultiplexing unit 3055.

The demultiplexing unit 1055 demultiplexes the signal input from the radio receiving unit 3057 into PUCCH, PUSCH, and the signal such as the uplink reference signal. The demultiplexing is performed based on radio resource allocation information, predetermined by the base station apparatus 3 using the radio resource control unit 3011, that is included in the uplink grant notified to each of the terminal apparatuses 1. Furthermore, the demultiplexing unit 3055 performs channel compensation of the PUCCH and the PUSCH based on the channel estimate value input from the measurement unit 3059. Furthermore, the demultiplexing unit 3055 outputs an uplink reference signal resulting from the demultiplexing, to the measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme predetermined in advance, such as Binary Phase Shift Keying (BPSK), QPSK, 16 QAM, 64 QAM, or 256 QAM, or in compliance with the modulation scheme that the base station apparatus 3 itself notified in advance with the uplink grant each of the terminal apparatuses 1. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal apparatuses 1 and information indicating the precoding to be performed on the sequences.

The decoding unit 3051 decodes the coded bits of the PUCCH and the PUSCH, which have been demodulated, at a transmission or original coding rate in compliance with a coding scheme predetermined in advance, the transmission or original coding rate being predetermined in advance or being notified in advance with the uplink grant to the terminal apparatus 1 by the base station apparatus 3 itself, and outputs the decoded uplink data and uplink control information to the higher layer processing unit 101. In a case that the PUSCH is retransmitted, the decoding unit 3051 performs the decoding with the coded bits input from the higher layer processing unit 301 and retained in a HARQ buffer, and the demodulated coded bits. The measurement unit 3059 measures the channel estimate value, the channel quality, and the like, based on the uplink reference signal input from the demultiplexing unit 3055, and outputs a result of the measurement to the demultiplexing unit 3055 and the higher layer processing unit 301.

The transmitter 307 generates the downlink reference signal in accordance with the control signal input from the controller 303, codes and modulates the downlink control information and the downlink data that are input from the higher layer processing unit 301, multiplexes the PDCCH, the PDSCH, and the downlink reference signal and transmits a signal resulting from the multiplexing to the terminal apparatus 1 through the transmit and/or receive antenna 309 or transmits the PDCCH, the PDSCH, and the downlink reference signal to the terminal apparatus 1 through the transmit and/or receive antenna 309 by using separate radio resources.

The coding unit 3071 codes the downlink control information and the downlink data input from the higher layer processing unit 301. The modulation unit 3073 modulates the coded bits input from the coding unit 3071, in compliance with a modulation scheme such as BPSK, QPSK, 16 QAM, 64 QAM, and 256 QAM.

The downlink reference signal generation unit 3079 generates, as the downlink reference signal, a sequence known to the terminal apparatus 1, the sequence being determined in accordance with a predetermined rule based on the physical cell identity (PCI) for identifying the base station apparatus 3, or the like.

The multiplexing unit 3075, in accordance with the number of PDSCH layers to be spatially-multiplexed, maps one or more pieces of downlink data to be transmitted on one PDSCH to one or more layers, and performs precoding on the one or more layers. The multiplexing unit 3075 multiplexes the downlink physical channel signal and the downlink reference signal for each transmit antenna port. The multiplexing unit 3075 maps the downlink physical channel signal and the downlink reference signal to the resource elements for each transmit antenna port.

The radio transmitting unit 3077 performs Inverse Fast Fourier Transform (IFFT) on the modulation symbol resulting from the multiplexing or the like to perform the modulation in compliance with an OFDM scheme, adds the Guard Interval to the OFDM-modulated OFDM symbol to generate a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 309 for transmission.

(1) To be more specific, a terminal apparatus 1 according to a first aspect of the present invention is a terminal apparatus for communicating with a base station apparatus, the terminal apparatus including a receiver configured to receive a physical downlink control channel, and a transmitter configured to transmit a physical uplink control channel, wherein the receiver receives downlink control information carried on the physical downlink control channel, a downlink control information format of the downlink control information is used for scheduling of a physical downlink shared channel, the downlink control information format includes information indicating a resource of a sounding reference signal, and the physical uplink control channel is transmitted, based on the information indicating the resource of the sounding reference signal.

(2) A base station apparatus 3 according to a second aspect of the present invention is a base station apparatus for communicating with a terminal apparatus, the base station apparatus including a transmitter configured to transmit a physical downlink control channel and a receiver configured to receive a physical uplink control channel, wherein the transmitter transmits downlink control information carried on the physical downlink control channel, a downlink control information format of the downlink control information is used for scheduling of a physical downlink shared channel, and the downlink control information format includes information indicating a resource of a sounding reference signal.

(3) A communication method according to a third aspect of the present invention is a communication method for a terminal apparatus for communicating with a base station apparatus, the communication method including receiving a physical downlink control channel, transmitting a physical uplink control channel, and receiving downlink control information carried on the physical downlink control channel, wherein a downlink control information format of the downlink control information is used for scheduling of a physical downlink shared channel, the downlink control information format includes information indicating a resource of a sounding reference signal, and the uplink control channel is transmitted based on the information indicating the resource of the sounding reference signal.

(4) A communication method according to a fourth aspect of the present invention is a communication method for a base station apparatus for communicating with a terminal apparatus, the communication method including transmitting a physical downlink control channel, receiving a physical uplink control channel, and transmitting downlink control information carried on the physical downlink control channel, wherein a downlink control information format of the downlink control information is used for scheduling of a physical downlink shared channel, and the downlink control information format includes information indicating a resource of a sounding reference signal.

(5) An integrated circuit according to a fifth aspect of the present invention is an integrated circuit mounted on a terminal apparatus for communicating with a base station apparatus, the integrated circuit including a receiving unit configured to receive a physical downlink control channel and a transmitting unit configured to transmit a physical uplink control channel, wherein the receiving unit receives downlink control information carried on the physical downlink control channel, a downlink control information format of the downlink control information is used for scheduling of a physical downlink shared channel, the downlink control information format includes information indicating a resource of a sounding reference signal, and the uplink control channel is transmitted based on the information indicating the resource of the sounding reference signal.

(6) An integrated circuit according to a sixth aspect of the present invention is an integrated circuit mounted on a base station apparatus for communicating with a terminal apparatus, the integrated circuit including a transmitting unit configured to transmit a physical downlink control channel and a receiving unit configured to receive a physical uplink control channel, wherein the transmitting unit transmits downlink control information carried on the physical downlink control channel, a downlink control information format of the downlink control information is used for scheduling of a physical downlink shared channel, and the downlink control information format includes information indicating a resource of a sounding reference signal.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that, in the embodiments according to the present invention, an example has been described in which the present invention is applied to a communication system constituted by a base station apparatus and a terminal apparatus, but the present invention can also be applied in a system in which terminals communicate with each other, such as D2D (Device to Device).

Note that the present invention of the present patent application is not limited to the above-described embodiments. According to the embodiment, apparatuses have been described as an example, but the present invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

CROSS-REFERENCE OF RELATED APPLICATION

This application claims the benefit of priority to JP 2017-172867 filed on Sep. 8, 2017, which is incorporated herein by reference in its entirety.

REFERENCE SIGNS LIST 1 (1A, 1B, 1C) Terminal apparatus
3 Base station apparatus
10 TXRU
11 Phase shifter
12 Antenna
101 Higher layer processing unit
103 Controller
105 Receiver
107 Transmitter
109 Antenna
301 Higher layer processing unit
303 Controller
305 Receiver
307 Transmitter
1011 Radio resource control unit
1013 Scheduling information interpretation unit
1015 Channel state information report control unit
1051 Decoding unit
1053 Demodulation unit
1055 Demultiplexing unit
1057 Radio receiving unit
1059 Measurement unit
1071 Coding unit
1073 Modulation unit
1075 Multiplexing unit
1077 Radio transmitting unit
1079 Uplink reference signal generation unit
3011 Radio resource control unit
3013 Scheduling unit
3015 Channel state information report control unit
3051 Decoding unit
3053 Demodulation unit
3055 Demultiplexing unit
3057 Radio receiving unit
3059 Measurement unit
3071 Coding unit
3073 Modulation unit
3075 Multiplexing unit
3077 Radio transmitting unit
3079 Downlink reference signal generation unit
S1 SRS Resource #1
S2 SRS Resource #2
S3 SRS Resource #3
S4 SRS Resource #4

The invention claimed is:

1. A terminal apparatus comprising:
a higher layer processing unit configured to receive an index relating to a resource of a sounding reference signal;
a receiver configured to receive a physical downlink control channel; and
a transmitter configured to transmit a physical uplink control channel, wherein
the receiver receives downlink control information carried on the physical downlink control channel,
a format of the downlink control information is used for scheduling of a physical downlink shared channel,
the format of the downlink control information includes information indicating a resource of the physical uplink control channel, and
the transmitter transmits the physical uplink control channel, based on the resource of the physical uplink control channel, the resource of the sounding reference signal, and the index relating to the resource of the sounding reference signal.

2. A base station apparatus comprising:
a higher layer processing unit configured to transmit an index relating to a resource of a sounding reference signal;
a transmitter configured to transmit a physical downlink control channel; and
a receiver configured to receive a physical uplink control channel, wherein
the transmitter transmits downlink control information carried on the physical downlink control channel,
a format of the downlink control information is used for scheduling of a physical downlink shared channel,
the format of the downlink control information includes information indicating a resource of the physical uplink control channel, and
the receiver receives the physical uplink control channel, based on the resource of the physical uplink control channel, the resource of the sounding reference signal, and the index relating to the resource of the sounding reference signal.

3. A communication method for a terminal apparatus, the communication method comprising:
receiving an index relating to a resource of a sounding reference signal;
receiving a physical downlink control channel; and
a transmitter configured to transmit a physical uplink control channel, wherein
downlink control information carried on the physical downlink control channel is received,
a format of the downlink control information is used for scheduling of a physical downlink shared channel,
the format of the downlink control information includes information indicating a resource of the physical uplink control channel, and
the physical uplink control channel is transmitted based on the resource of the physical uplink control channel, the resource of the sounding reference signal, and the index relating to the resource of the sounding reference signal.

4. A communication method for a base station apparatus, the communication method comprising:

transmitting an index relating to a resource of a sounding reference signal;

transmitting a physical downlink control channel; and receiving a physical uplink control channel, wherein downlink control information carried on the physical downlink control channel is transmitted, a format of the downlink control information being used for scheduling of a physical downlink shared channel, the format of the downlink control information including information indicating a resource of the physical uplink control channel, and receiving the physical uplink control channel, based on the resource of the physical uplink control channel, the resource of the sounding reference signal, and the index relating to the resource of the sounding reference signal.

5. An integrated circuit mounted on a terminal apparatus, the integrated circuit comprising:

a higher layer processing unit configured to receive an index relating to a resource of a sounding reference signal;

a receiving unit configured to receive a physical downlink control channel; and a transmitting unit configured to transmit a physical uplink control channel, wherein the receiving unit receives downlink control information carried on the physical downlink control channel, a format of the downlink control information is used for scheduling of a physical downlink shared channel, the format of the downlink control information includes information indicating a resource of the physical uplink control channel, and the transmitting unit transmits the physical uplink control channel, based on the resource of the physical uplink control channel, the resource of the sounding reference signal, and the index relating to the resource of the sounding reference signal.

6. An integrated circuit mounted on a base station apparatus, the integrated circuit comprising:

a higher layer processing unit configured to transmit an index relating to a resource of a sounding reference signal;

a transmitting unit configured to transmit a physical downlink control channel; and a receiving unit configured to receive a physical uplink control channel, wherein the transmitting unit transmits downlink control information carried on the physical downlink control channel, a format of the downlink control information is used for scheduling of a physical downlink shared channel, the format of the downlink control information includes information indicating a resource of the physical uplink control channel, and the receiving unit receives the physical uplink control channel, based on the resource of the physical uplink control channel, the resource of the sounding reference signal, and the index relating to the resource of the sounding reference signal.

\* \* \* \* \*